No. 736,241. PATENTED AUG. 11, 1903.
R. FLETCHER.
CHARCOAL COOKING ATTACHMENT FOR STOVES.
APPLICATION FILED MAY 17, 1901.
NO MODEL.

Witnesses.
L. Trimble
Edw. L. Reed.

Inventor.
R. Fletcher
by Fetherstonhaugh & Co.
Atty's.

No. 736,241. Patented August 11, 1903.

UNITED STATES PATENT OFFICE.

ROBERT FLETCHER, OF TORONTO, CANADA.

CHARCOAL COOKING ATTACHMENT FOR STOVES.

SPECIFICATION forming part of Letters Patent No. 736,241, dated August 11, 1903.

Application filed May 17, 1901. Serial No. 60,758. (No model.)

*To all whom it may concern:*

Be it known that I, ROBERT FLETCHER, merchant, of the city of Toronto, in the county of York, in the Province of Ontario, Canada, have invented certain new and useful Improvements in Charcoal Cooking Attachments for Stoves, of which the following is a specification.

My invention relates to improvements in charcoal or chip cooking attachments for stoves; and the object of the invention is to devise a very simple attachment to be placed over a stove-hole of an ordinary range, whereby in warm weather light cooking may be carried on at a minimum expense with a minimum amount of heat; and it consists, essentially, of a cylindrical casing having an adjustable front damper, a suitable lid or top, and a closed bottom, the interior of the cylindrical casing being provided with a division-plate having an opening at the lower portion thereof which communicates with an opening in the bottom of the attachment, the draft being directed through the attachment in the manner hereinafter more particularly explained.

Figure 1:
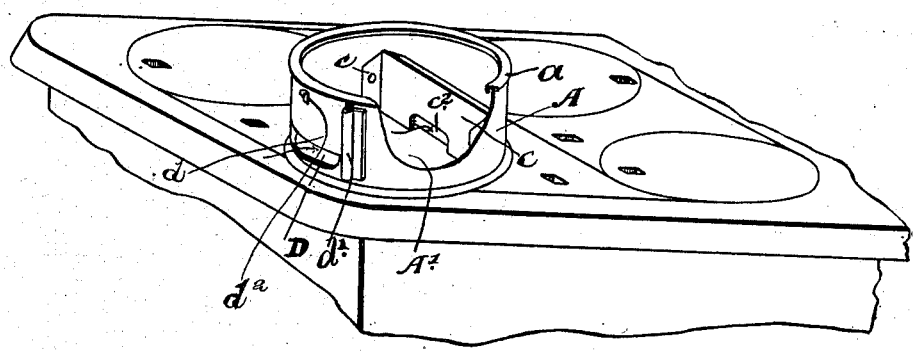
Figure 2:
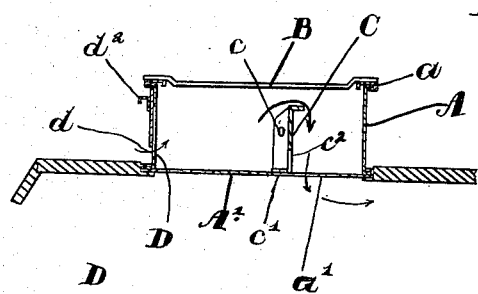

Figure 1 is a perspective view of a portion of a cooking-stove, showing my attachment placed in position over one of the stove-holes. Fig. 2 is a vertical section through my attachment and the top of the stove.

In the drawings like letters of reference indicate corresponding parts in each figure.

A is a cylindrical casing provided with a top rim or flange $a$, upon which is supported the lid B, which is of course removed when it is desired to place a kettle, frying-pan, or other utensil upon the top of the attachment, so as to close the same.

A' is the bottom, which is suitably secured to the bottom edge of the cylinder.

C is a division-plate which is provided with end flanges $c$, whereby it is secured to the interior of the periphery of the cylinder, and bottom flanges $c'$, whereby it is secured to the bottom.

$a'$ is a hole in the bottom located on the side of the division-plate C opposite to that in which the fuel is placed. The division-plate C is provided with an opening $c^2$ at the bottom thereof.

D is a draft-opening at the front of the fire-box, such opening being covered by a slide-damper $d$, which has bent ends, which extend into suitable guideways $d'$, so that such damper may be raised upwardly and downwardly by means of the lip $d^2$, so as to control the amount of draft passing into the fire-box. The direction of the draft is indicated by arrows.

The charcoal is placed in front of the plate C, and the draft when the fire is kindled passes up through the charcoal, over the division-plate C, and down through the opening $a'$ underneath the top of the stove, whence it passes up the ordinary smoke-pipe of the stove. The opening $c^2$ is provided so that the bottom of the fire will be kept alive, and as this opening is small a slight direct draft is always maintained at the bottom of the fire and passes directly through the opening $c^2$ and down through the opening $a'$.

What I claim as my invention is—

In combination with a circular casing designed to be placed over a stove-hole and fit upon the ledge of the same and having a permanent bottom and removable cover, of a vertically-placed division-plate extending across the casing and upwardly, so as to leave a space between the top of the same and the cover and having an opening at the bottom relatively much smaller than the opening left between the top of the division-plate and the cover, the said casing having a damper-opening at the front thereof opposite the small opening in the division-plate and an opening in the bottom behind the division-plate whereby the greater draft is created through the damper and over the division-plate and through the opening behind the same and a slight subsidiary draft passes through the small opening in the division-plate and the aforesaid opening in the bottom behind the plate, substantially as described.

ROBERT FLETCHER.

Witnesses:
B. BOYD,
R. SHIELDS.